017
United States Patent Office 3,288,724
Patented Nov. 29, 1966

3,288,724
PROCESS FOR PREPARING A SILICON CARBIDE SUPPORTED VANADIUM-CONTAINING OXIDATION CATALYST
Joseph L. Russell, Ridgewood, and Mitchell Becker, Teaneck, N.J., assignors to Halcon International, Inc., a corporation of Delaware
No Drawing. Filed May 14, 1965, Ser. No. 455,944
6 Claims. (Cl. 252—443)

This application is a continuation-in-part of our copending U.S. patent application Serial Number 137,008, filed September 11, 1961, now abandoned.

This invention relates to a new and improved catalyst and its method of preparation. More specifically, this invention relates to a supported catalyst useful in the preparation of phthalic anhydride by oxidation.

Catalyst preparation has long been known to be of major importance in determining the success of a catalyst in a particular reaction. Where a catalyst is deposited on a support or treated by differing methods, different results are often obtained.

Broadly, oxidation catalysts are well known in the art, for example, U.S. Patent No. 1,930,716 describes a class of catalysts and the supports therefore. These catalysts are oxides selected from the 4th through 8th groups of the periodic table. Specifically they include oxides of vanadium, titanium, chromium, molybdenum, tungsten, uranium, manganese, iron, cobalt, or nickel either singly or in combination. Most preferred are those metals having atomic numbers of from 23 to 28, inclusive. The supports are highly refractory carbides of the elements of the 4th group of the periodic table such as silicon carbide, titanium, carbide or oxides of silicon, aluminum, magnesium, etc. Conventionally, the preparation of a catalyst necessitates two distinct steps: firstly, the coating step wherein the active catalyst is deposited on the support; and secondly, the drying step wherein the residual moisture is removed. The conditions under which these steps are performed, as mentioned above, can be the difference between success and failure of the selectivity to the desired reaction products. By following the teachings of the present invention the catalyst prepared has the following advantages in the oxidation of hydrocarbons to form phthalic anhydride:

(1) Mixed feeds of phthalic anhydride precursors may be used while maintaining high yields of phthalic anhydride. Prior catalysts which were successfully employed with naphthalene feed were found to be deficient when an ortho-xylene feed or a mixed feed was used. It is often necessary, in order to insure continuity of operation to substitute one feed for the other when a feedstock shortage exists. Hence, in accordance with this invention, it is no longer necessary to shut down operation or change catalyst when the particular feedstock for which the plant was designed becomes permanently or temporarily unavailable.

(2) Exceptionally high purity crude product is obtained from this catalyst as contrasted with prior processes. A high purity product requires less treatment of the reactor effluent. The product obtained when using the instant catalyst is relatively free from tars, benzoic acid, toluic acid, toluylaldehyde, toluic anhydride, toluquinone and has extremely low naphthaquinone and/or phthalide content.

(3) Reaction temperatures are reduced since carbon monoxide and carbon dioxide formation which accounts for the major portion of the exothermicity is minimized. This permits increased throughput at high yields, thus increasing the production of phthalic anhydride for a particular plant investment. Additionally, decreased temperatures avoid material corrosion, sintering and deactivation of the catalyst, and decomposition of the circulating salt coolant.

In accordance with the instant invention it has been found that by carefully controlling the preparation of the supported catalyst and by selecting supports with the appropriate properties, an excellent catalyst is obtained. As to the catalyst support, it must have the following properties:

(1) High heat conductivity, at least 1.80 B.t.u./(hr.-ft.$^2$) (° C./ft.), preferably, at least 3 B.t.u./(hr.-ft.$^2$) (° C./ft.).

(2) High purity, less than 5%, preferably less than 2%, binder.

(3) Low surface area, less than one square meter per gram.

(4) Low water absorption, less than 15%.

In preparing the active catalyst, any of the conventional techniques may be employed. Basically, the catalyst is dissolved and maintained in solution as a salt. See for example, U.S. Patent 2,777,860 wherein the catalyst is dissolved in concentrated hydrochloric acid. Also note U.S. Patents 2,180,353 and 2,209,908. This solution of the active catalyst is brought into contact with the support in the coating step by either immersion, spraying or dipping.

The amount of catalyst in solution, and the amount of solution used to coat a fixed quantity of the support must be carefully controlled. Broadly, the weight ratio of catalyst expressed as metal oxide, to support is 1:20 to 1:5. Preferred are ratios from 1:12.5 to 1:6, and most desirable are ratios from 1:10 to 1:6.7. Regardless of the techniques of coating used, the catalyst temperature is maintained at between 90° and 200° C., preferably between 100° and 150° C. A purge gas such as nitrogen or air, or a vacuum may be used to assist in the initial drying. The purge gas may also serve as a carrier in spray coating. In this step the acid or water is continuously evaporated until the material no longer appears wet. This point may be determined by changes in color; for example, where vanadium pentoxide is dissolved, the evaporation should be discontinued before the color changes from black-green to light green or yellow. Air or other inert gases may be used to maintain the evaporation time from ½ to 8 hours, preferably 3 to 6 hours.

It is essential that the supported catalyst be transferred as rapidly as possible to the drying step once apparent dryness is reached. The transfer should be made in less than three hours, preferably in less than 30 minutes, and most desirably within five minutes. Maintaining the supported catalyst at the coating temperature for extended periods, or allowing it to cool, severely degrades the resultant catalyst.

In the drying step, the supported catalyst particles must be heated in less than 1½ hours, preferably in less than 50 minutes to between 200° to 450° C., preferably between 260° to 340° C. The time to reach the appropriate temperature is dependent on the drying rate, which, in turn, is controlled by such factors as bed thickness, air circulation, pressure, etc. Once the appropriate particle temperature is achieved, the particles may be held at this temperature without detrimental effect.

When air and naphthalene are used as feed to the oxidation reaction they are maintained in proportions of 18.0 to 25:1 by weight. When ortho-xylene is the hydrocarbon, proportions of 15 to 30:1 by weight may be used. With both feeds, temperatures of 350° to 440° C. and pressures of atmospheric and above are suitable.

EXAMPLE 1

One part of $V_2O_5$ in three parts of concentrated hydrochloric acid is refluxed until the solution turns dark blue and solids are no longer visible. This solution is added batchwise onto 9.0 parts of 6 to 8 mesh granular silicon carbide having the following composition:

*Table I*

| Component: | Parts by weight |
|---|---|
| Silicon carbide | 96.5 |
| Silica | 1.0 |
| Alumina | 0.6 |
| Ferric oxide | 0.4 |
| Surface silicon | 0.7 |
| Carbon | 0.5 |

The support has a binder composition of 1.6%, a surface area of about 0.7 m.$^2$/gm., a heat conductivity of about 8 B.t.u./hr.-ft.$^2$) (° F./ft.), and a water absorption of less than 15%. The temperature is maintained between 90° to 150° C. Air is passed into the coating vessel so as to hold the bulk coating time to about 4 hours. When the bulk of the hydrochloric acid is evaporated and a porcelain spatula is no longer wetted when placed in contact with the catalyst, heat is discontinued.

The catalyst is then transferred immediately to preheated trays and charged to an air circulating oven and brought to a temperature of 300° C. in about 30 minutes whereupon drying is completed. The dried catalyst is charged to a circulating salt reactor and heated to about 370° C. while air is passed through the bed at 100 to 750$^{-hrs.}$ S.T.P.

After the catalyst reaches a temperature of about 370° C., air is passed through the bed for an additional four hour period. Mixtures of air and naphthalene (78° C.) are passed over the catalyst in the proportion of 18.5:1 by weight at temperatures of 415° C. The space velocity is 6000$^{-hrs.}$ S.T.P. The effluent product is analyzed by polarographic and infra-red techniques. It is found that 96 to 98 parts of phthalic anhydride are produced for every 100 parts of contained naphthalene fed to the reactor. Naphthoquinone is found to be less than 1.5% indicating the high quality of the phthalic anhydride using a single pass reactor.

The naphthalene feed is discontinued and a mixture of 95% ortho-xylene and air is fed over the catalyst in the proportions of 16.6:1 by weight at temperatures of 427° C. The same space velocity as above is maintained. It is found that 92 to 96 parts of phthalic anhydride are produced for every 100 parts of contained ortho-xylene fed to the reactor. The effluent product is analyzed for other by-products reported in the literature normally found when oxidizing ortho-xylene, such as toluic acid, toluylaldehyde, toluic anhydride, toluquinone, phthalide, etc. None of these products are in the effluent product except for phthalide, found in about 0.1 part per 100 parts of phthalic anhydride. Phthalide itself can be readily eliminated from the effluent by techniques known to those skilled in the art. It becomes obvious that the operating conditions of this catalyst is not specific for feeds of naphthalene or ortho-xylene, or mixtures thereof. The lack of by-products normally reported in the literature when using ortho-xylene feed further points out the high selectivity of this catalyst for converting various feeds or mixtures thereof to phthalic anhydride.

EXAMPLE 2

A catalyst is prepared following the procedures described above, except that the high purity "grain" silicon carbide is replaced with a bonded silicon carbide having the following composition:

*Table II*

| Composition: | Parts by weight |
|---|---|
| Silicon carbide | 77.8 |
| Silica | 14.5 |
| Alumina | 4.4 |
| Ferric oxide | 0.8 |
| Calcium oxide | 1.0 |
| Sodium oxide | 0.9 |
| Potassium oxide | 0.6 |

This support has a water absorption of 22 to 30% and a surface area substantially higher than the "grain" silicon carbide.

A mixture of 95% ortho-xylene and air is fed over the catalyst in the proportions of 26:1 by weight at temperatures of 400° C. The space velocity is 3000$^{-hrs.}$ S.T.P. It is found that only 79 parts of phthalic anhydride are produced for every 100 parts of contained ortho-xylene fed to the reactor. This example shows that a support having an increased amount of binder, high surface area, high water absorptivity gives inferior results, even at a lower space velocity, than the practice of the invention.

EXAMPLE 3

A catalyst is prepared following the procedures described in Example 1, except that during the coating period, the evaporation of the hydrochloric acid-water is extended for three hours after apparent dryness is achieved before being finally dried.

A mixture of 95% ortho-xylene and air is fed over the catalyst in the proportions of 26:1 by weight at temperatures of 400° C. The space velocity is 3000$^{-hrs.}$ S.T.P. It is found that only 77 to 79 parts of phthalic anhydride are produced for every 100 parts of contained ortho-xylene fed to the reactor. This example shows the adverse effect of not bringing the catalyst to the proper drying temperature shortly after apparent dryness.

EXAMPLE 4

A catalyst is prepared following the procedures described in Example 1, except that the catalyst, after coating and "dry" to the spatula, is dried at 180° C. for a period of 30 minutes prior to charging to the reactor at 250 to 300° C.

A mixture of 95% ortho-xylene and air is fed over the catalyst in the proportions of 26:1 by weight at temperatures of 400° C. The space velocity is 3000$^{-hrs.}$ S.T.P. It is found that only 83 to 87 parts of phthalic anhydride were produced for every 100 parts of contained orthoxylene fed to the reactor. This decreased yield shows that low temperature drying is not satisfactory.

EXAMPLE 5

In an example according to the invention one part of $V_2O_5$ is refluxed with about 1.5 parts of concentrated hydrogen chloride until the solution turns dark blue and solids are no longer visible. This solution is sprayed on to about 9 parts of the silicon carbide support described in Example 1. The spraying takes place over a period of 6.5 hours at a temperature of 150° C. Upon completion of the spraying, the coated support which is dry in appearance is immediately transferred to pre-heated trays and further dried in a circulating air oven for 24 hours at about 288° C. A carbon steel reactor tube having 1 inch outer diameter is packed to a catalyst bed height of 75 inches with the said catalyst. Twelve inches of inert support is loaded at the inlet end of the reactor tube to provide a pre-heat zone. Circulating salt cooling means are provided to control the reactor temperature.

To the said reactor is charged air and 95% orthoxylene in a ratio of air to hydrocarbon by weight of about 26 to 1, at a space velocity is 3000$^{-hrs.}$ S.T.P. After 72 hours of operation at a temperature of about 413° C. about 92.7 parts of phthalic anhydride are produced for every 100 parts of contained ortho-xylene fed to the reactor.

It will be understood that modifications and variations may be affected without departing from the spirit of the invention.

What is claimed is:

1. A process for preparing a silicon carbide supported vanadium-containing hydrocarbon oxidation catalyst which comprises:

coating a solution containing a vanadium salt convertible to vanadium oxide on a high purity silicon carbide support having less than 5% binder and having a surface area of less than one square meter per gram by contacting said support with said solution at a temperature of from 90° C. to 200° C. for a period of from ½ to 8 hours until the support reaches a state of dryness whereby a porcelain spatula is no longer wetted when placed in contact therewith, the coated support having a ratio of 1 part by weight of vanadium salt to from 5–20 parts by weight of support.

commencing final drying of the coated support within 30 minutes after the support reaches said state of dryness by raising the temperature of the support to from 260° C. to 450° C. in less than 30 minutes, and continuing the heating within said temperature range to complete drying.

2. A process according to claim 1 wherein the coating is carried out for a period of from 3 to 6 hours.

3. A process according to claim 1 wherein the temperature of the coated support is raised to from 260° C. to 450° C. in less than 5 minutes after the support reaches said state of dryness.

4. A process according to claim 1 wherein the coating is carried out at a temperature of from 100° C. to 150° C.

5. A process according to claim 1 wherein the coating is carried out for a period of from 3 to 6 hours at a temperature of from 100° C. to 150° C., and wherein the temperature of the coated support is raised to from 260° C. to 450° C. in less than 5 minutes after the support reaches said state of dryness.

6. A process according to claim 5 wherein one part of vanadium salt is coated on from 6.7 to 10 parts by weight of the support.

References Cited by the Examiner
UNITED STATES PATENTS

| | | | |
|---|---|---|---|
| 1,930,716 | 10/1933 | Jaeger | 260—346.4 |
| 2,438,369 | 3/1948 | Levine | 252—443 X |
| 2,945,824 | 7/1960 | Fleck | 252—455 |
| 3,055,842 | 9/1962 | Robinson | 252—456 X |

OSCAR R. VERTIZ, *Primary Examiner.*

BENJAMIN HENKIN, *Examiner.*

E. J. MEROS, *Assistant Examiner.*